US009489161B2

(12) United States Patent
Luo et al.

(10) Patent No.: US 9,489,161 B2
(45) Date of Patent: Nov. 8, 2016

(54) AUTOMATIC SELECTION OF WEB PAGE OBJECTS FOR PRINTING

(75) Inventors: Ping Luo, Beijing (CN); Li-Mei Jiao, Beijing (CN); Zhang-Hui Chen, Beijing (CN); Huiman Hou, Beijing (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 59 days.

(21) Appl. No.: 14/353,234

(22) PCT Filed: Oct. 25, 2011

(86) PCT No.: PCT/CN2011/001774
§ 371 (c)(1),
(2), (4) Date: Apr. 21, 2014

(87) PCT Pub. No.: WO2013/059958
PCT Pub. Date: May 2, 2013

(65) Prior Publication Data
US 2014/0233066 A1 Aug. 21, 2014

(51) Int. Cl.
G06F 3/12 (2006.01)
G06F 17/21 (2006.01)

(52) U.S. Cl.
CPC ........... G06F 3/1273 (2013.01); G06F 17/218 (2013.01); G06F 2216/17 (2013.01)

(58) Field of Classification Search
USPC .................... 358/1.15, 1.14, 1.12, 1.17, 1.18
See application file for complete search history.

(56) References Cited

U.S. PATENT DOCUMENTS

| | | | |
|---|---|---|---|
| 6,029,182 A | 2/2000 | Nehab et al. | |
| 6,230,622 B1 | 5/2001 | Dilling | |
| 6,975,419 B2 | 12/2005 | Staas et al. | |
| 7,065,497 B1 | 6/2006 | Brewster et al. | |
| 7,225,401 B2 | 5/2007 | Purvis | |
| 7,249,319 B1 | 7/2007 | Payne et al. | |
| 7,290,285 B2 | 10/2007 | McCurdy et al. | |
| 7,302,423 B2 | 11/2007 | De Bellis | |
| 7,386,791 B2 | 6/2008 | Jacobson | |
| 7,565,350 B2 | 7/2009 | Fetterly et al. | |
| 7,617,446 B2 | 11/2009 | Dutta | |
| 7,711,747 B2 | 5/2010 | Renders et al. | |
| 7,720,835 B2 | 5/2010 | Ward et al. | |

(Continued)

FOREIGN PATENT DOCUMENTS

| | | |
|---|---|---|
| CN | 1245928 A | 3/2000 |
| CN | 101169707 A | 4/2008 |

(Continued)

OTHER PUBLICATIONS

International Preliminary Report on Patentability received for PCT Application No. PCT/CN2011/001774, Jan. 23, 2014, 5 pages.

(Continued)

Primary Examiner — Jerome Grant, II
(74) Attorney, Agent, or Firm — HP Inc Patent Department

(57) ABSTRACT

A method includes receiving a request to print a current web page. A set of records that represent web pages that are similar to the current web page are identified from a print log that includes at least one record, each record including an indication of a web page and indicating one or more objects that had been previously selected for printing from that web page. Based on the objects that are indicated by the identified set of records, one or more objects of the current web page are selected to be printed on a printer.

20 Claims, 5 Drawing Sheets

(56) References Cited

U.S. PATENT DOCUMENTS

| | | | |
|---|---|---|---|
| 7,769,751 B1 | 8/2010 | Wu et al. | |
| 7,861,165 B2 | 12/2010 | Stevenson | |
| 7,996,000 B1 | 8/2011 | Dubinko et al. | |
| 8,020,090 B2 | 9/2011 | Chen et al. | |
| 8,046,681 B2 | 10/2011 | Vydiswaran et al. | |
| 8,479,092 B1 | 7/2013 | Pandey | |
| 8,593,666 B2 | 11/2013 | Xiao | |
| 8,645,369 B2 | 2/2014 | Poblete et al. | |
| 8,683,379 B2 | 3/2014 | LuVogt et al. | |
| 8,713,438 B1 | 4/2014 | Broniek et al. | |
| 8,745,091 B2 | 6/2014 | McHenry et al. | |
| 2002/0048037 A1 | 4/2002 | Carbone | |
| 2002/0078045 A1 | 6/2002 | Dutta | |
| 2002/0123988 A1 | 9/2002 | Dean et al. | |
| 2003/0142801 A1 | 7/2003 | Pecht | |
| 2003/0210424 A1 | 11/2003 | Sandfort et al. | |
| 2004/0185882 A1 | 9/2004 | Gecht et al. | |
| 2004/0249934 A1 | 12/2004 | Anderson | |
| 2004/0252332 A1 | 12/2004 | McCoog et al. | |
| 2005/0120311 A1 | 6/2005 | Thrall | |
| 2005/0138065 A1 | 6/2005 | Ciriza | |
| 2005/0154718 A1 | 7/2005 | Payne et al. | |
| 2006/0033950 A1 | 2/2006 | Nakamura | |
| 2006/0048004 A1* | 3/2006 | Kawashima | 714/23 |
| 2006/0048053 A1 | 3/2006 | Sembower et al. | |
| 2006/0123114 A1 | 6/2006 | Aoki et al. | |
| 2006/0125820 A1 | 6/2006 | Turcan et al. | |
| 2006/0143286 A1 | 6/2006 | Aoki et al. | |
| 2006/0167862 A1 | 7/2006 | Reisman | |
| 2006/0173985 A1 | 8/2006 | Moore | |
| 2006/0277482 A1 | 12/2006 | Hoffman et al. | |
| 2007/0027932 A1 | 2/2007 | Thibeault | |
| 2007/0047844 A1 | 3/2007 | Watanabe et al. | |
| 2007/0070401 A1* | 3/2007 | Okamoto et al. | 358/1.15 |
| 2007/0103715 A1* | 5/2007 | Nakata | 358/1.14 |
| 2007/0130509 A1 | 6/2007 | Gombert et al. | |
| 2007/0174298 A1 | 7/2007 | Tanimoto | |
| 2007/0220411 A1 | 9/2007 | Hauser | |
| 2007/0247664 A1 | 10/2007 | Yamamoto | |
| 2008/0005250 A1 | 1/2008 | Oksum | |
| 2008/0005651 A1 | 1/2008 | Grefenstette et al. | |
| 2008/0030775 A1 | 2/2008 | Adachi et al. | |
| 2008/0046459 A1 | 2/2008 | Hinohara | |
| 2008/0068650 A1 | 3/2008 | Negoro | |
| 2008/0089709 A1 | 4/2008 | Higashi | |
| 2008/0097828 A1 | 4/2008 | Silverbrook et al. | |
| 2008/0147514 A1 | 6/2008 | Shuster et al. | |
| 2008/0307308 A1 | 12/2008 | Sullivan et al. | |
| 2009/0002770 A1 | 1/2009 | Cavill et al. | |
| 2009/0013071 A1 | 1/2009 | Matoba et al. | |
| 2009/0030889 A1 | 1/2009 | Chatow et al. | |
| 2009/0119260 A1 | 5/2009 | Chopra et al. | |
| 2009/0171751 A1 | 7/2009 | Zhou et al. | |
| 2009/0231609 A1 | 9/2009 | Chipchase et al. | |
| 2009/0310168 A1 | 12/2009 | Kunioka et al. | |
| 2009/0316198 A1 | 12/2009 | Takeuchi et al. | |
| 2010/0030768 A1 | 2/2010 | Poblete et al. | |
| 2010/0058204 A1 | 3/2010 | Wilson | |
| 2010/0069116 A1 | 3/2010 | Silverbrook et al. | |
| 2010/0145955 A1 | 6/2010 | McDonald et al. | |
| 2010/0281351 A1 | 11/2010 | Mohammed | |
| 2010/0328725 A1 | 12/2010 | Gaucas et al. | |
| 2011/0040823 A1 | 2/2011 | Liu et al. | |
| 2011/0078558 A1 | 3/2011 | Bao et al. | |
| 2011/0194139 A1* | 8/2011 | Xiao et al. | 358/1.15 |
| 2011/0213894 A1 | 9/2011 | Silberstein et al. | |
| 2011/0235088 A1 | 9/2011 | Luo | |
| 2011/0292440 A1* | 12/2011 | Kotake | 358/1.15 |
| 2012/0011021 A1 | 1/2012 | Wang et al. | |
| 2012/0062926 A1* | 3/2012 | Takada | G06F 3/1205 358/1.13 |
| 2012/0062935 A1 | 3/2012 | Kamath et al. | |
| 2012/0212772 A1 | 8/2012 | Hwang et al. | |
| 2012/0262754 A1 | 10/2012 | Hwang | |
| 2013/0010333 A1 | 1/2013 | Anand et al. | |
| 2013/0097102 A1 | 4/2013 | Revesz | |
| 2013/0103461 A1 | 4/2013 | Bhatia | |
| 2013/0185364 A1 | 7/2013 | Bhatia | |
| 2013/0222843 A1 | 8/2013 | Ganesan et al. | |
| 2014/0036303 A1 | 2/2014 | Vishwanath et al. | |
| 2014/0057238 A1 | 2/2014 | Okamoto et al. | |
| 2014/0122486 A1 | 5/2014 | Simard et al. | |
| 2014/0136541 A1 | 5/2014 | Farahat et al. | |
| 2014/0214632 A1 | 7/2014 | Garera et al. | |

FOREIGN PATENT DOCUMENTS

| | | |
|---|---|---|
| CN | 101329687 A | 12/2008 |
| CN | 102073728 A | 5/2011 |
| CN | 102253937 A | 11/2011 |
| EP | 0986213 A2 | 3/2000 |
| JO | 2007257069 A | 10/2007 |
| WO | WO-2013048428 A1 | 4/2013 |
| WO | WO-2013159246 | 10/2013 |

OTHER PUBLICATIONS

International Search Report and Written Opinion received for PCT Application No. PCT/CN2011/001774; Jun. 28, 2012, 10 pages.

Lim. S. et al., Automatic Selection of Print-worthy Content for Enhanced Web Page Printing Experience, (Research Paper), Sep. 21-24, 2010.

Pasternack, J, et al., Extracting Article Text From the Web with Maximum Subsequence Segmentation, (Research Paper), Apr. 20-24, 2009.

Cai et al., "Block-level link analysis," 2004, Proceedings of the 27th annual international ACM SIGIR conference on Research and development in information retrieval, 2004, pp. 440-447, <http://research-srv.microsoft.com/pubs/69111/22.pdf>.

Cai et al., "VIPS: a vision-based page segmentation algorithm," 2003, Microsoft Technical Report, MSR-TR-2003-79, <http://research.microsoft.com/pubs/70027/tr-2003-79.pdf> (29 pages).

Chen, Y. et al., "Improve on Frequent Access Path Algorithm in Web Page Personalized Recommendation Model," (Research Paper), 2011 International Conference on Information Science and Technology (ICIST), Mar. 2011, found at http://ieeexplore.ieee.org/stamp/stamp.jsp?arnumber=5765216 (4 pages).

Formatdynamics, "Print or PDF with CleanPrint," Sep. 29, 2014, found at https://chrome.google.com/webstore/detail/print-or-pdf-with-cleanpr/fklmmmdcofimkjmfjdnobmmgmefbapkf/details?hl=en-US (2 pages).

Gupta et al., "DOM-based content extraction of HTML documents," 2003, Proceedings of the 12th International conference on World Wide Web, 2003<http://academiccommons.columbia.edu/download/fedora_content/download/ac:110022/CONTENT/cucs-024-02.pdf> (10 pages).

International Bureau, International Preliminary Report on Patentability, issued in PCT Application No. PCT/CN2012/000569, Nov. 4, 2014 (6 pages).

International Searching Authority, International Search Report issued in PCT Application No. PCT/CN2012/000569, Feb. 7, 2013, 6 pages.

Kim, S-M. et al., "Improving Web Page Classification by Label-propagation Over Click Graphs," (Research Paper), Nov. 2-6, 2009, available at http://www.patrickpantel.com/download/papers/2009/cikm09c.pdf (10 pages).

Luo, P. et al., "Web Article Extraction for Web Printing: a DOM+Visual based Approach," 9th ACM Symposium on Document Engineering, 2009 (5 pages).

Merrill, S., "Read any RSS feed on your Lexmark all-in-one printer," (Web Page), Jul. 6, 2010, found at http://techcrunch.com/2010/07/06/read-any-rss-feed-on-your-lexmark-all-in-one-printer/ (6 pages).

Printer-Friendly.com, "Printable web pages on the fly !", (Web Page), Jun. 12, 2010 <http://web.archive.org/web/20100612144126/http://www.printer-friendly.com/2008011945/java/web2printer.html> (3 pages).

(56) References Cited

OTHER PUBLICATIONS

Quora, "What are good examples of machine learning enhanced with human intervention in e-commerce?" 2011, found at http://www.quora.com/What-are-good-examples-of-machine-learning-enhanced-with-human-intervention-in-e-commerce (4 pages).

Song et al., "Learning Block Importance Models for Web Pages," May 17-22, 2004, Proceedings of the 13th international conference on World Wide Web 2004, <http://research.microsoft.com/en-us/people/jrwen/blockimportance.pdf> (9 pages).

SPCURTIS81, "App Idea—Select Your Own RSS Feed for Scheduled Printing," HP Support Forums, Jul. 26, 2012, found at http://h30434.www3.hp.com/t5/ePrint-Print-Apps-Mobile-Printing-and-ePrintCenter/App-Idea-Select-Your-Own-RSS-Feed-For-Scheduled-Printing/td-p/1700391 (2 pages).

Tsukada, M. et al., "Automatic Web-Page Classification by Using Machine Learning Methods," Web Intelligence: Research and Development, Springer Berlin Heidelberg, 2001, available at http://www.ar.sanken.osaka-u.ac.jp/papers/2006-12/wi01_tsukada.pdf (11 pages).

Wikipedia, "Amazon Mechanical Turk," Sep. 27, 2014, <http://en.wikipedia.org/wiki/Amazon_Mechanical_Turk> (7 pages).

Wikipedia, "Delicious (website)," Jun. 4, 2012, found at http://web.archive.org/web/20120604165352/https://en.wikipedia.org/wiki/Delicious_(website) (9 pages).

Wikipedia, "Google Bookmarks," Mar. 7, 2012, found at http://web.archive.org/web/20120307041604/http://en.wikipedia.org/wiki/Google_Bookmarks (7 pages).

Wikipedia, "Machine learning," Mar. 25, 2012, <http://en.wikipedia.org/wiki/Machine_learning> (9 pages).

Written Opinion received in PCT Application No. PCT/CN2012/000569, Feb. 7, 2013, 4 pages.

Yi et al., "Web page cleaning for web mining through feature weighting," 2003, Proceedings of the 18th international Joint Conference on Artificial Intelligence (IJCAI-03),<http://net.pku.edu.cn/~webg/src/paradise/reference/html-purifier/2003-ijcai-Web%20Page%20Cleaning%20for%20Web%20Mining%20through%20Feature%20Weighting.pdf> (6 pages).

Yu, B. et al., Abstract, "Video Summarization Based on User Log Enhanced Link Analysis," (Research Paper), 11th ACM International Conference on Multimedia, 2003, found at http://dl.acm.org/citation.cfm?id=957013.957095&coll=DL&dl=GUIDE&CFID=89676494&CFTOKEN=29375123 (1 page).

Hewlett-Packard Development Company, L.P., "HP Smart Print" (web page), available Apr. 24, 2011, <http://web.archive.org/web/20110424132923/http://h41112.www4.hp.com/bing_toolbar2/us/en/smart.html?jumpid=ex_r602_ww/en/hho/ipg/xx-mu-aw_chev/quickprint>.

Luo et al., "Web Article Extraction for Web Printing: a DOM+Visual based Approach," 9th ACM Symposium on Document Engineering, Aug. 21, 2009, <http://www.hpl.hp.com/techreports/2009/HPL-2009-185.pdf>.

PrintWhatYouLike.com, "PrintWhatYouLike.com," (web page), available Dec. 16, 2008, <http://web.archive.org/web/20081216060441/http://www.printwhatyoulike.com/>.

* cited by examiner

AUTOMATIC SELECTION OF WEB PAGE OBJECTS FOR PRINTING

CROSS-REFERENCE TO RELATED APPLICATION

This application is a national stage application under 35 U.S.C. §371 of PCT/CN2011/001774, filed Oct. 25, 2011.

BACKGROUND

A displayed web page, e.g. as accessed by an Internet browser, typically includes objects in addition to informative content of interest. Such additional objects may include, for example, screen controls (e.g. buttons), menus, links to other pages or sites, and advertising.

A user or application may wish to create a printed hardcopy of content of the page.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

DETAILED DESCRIPTION

Figure 1:
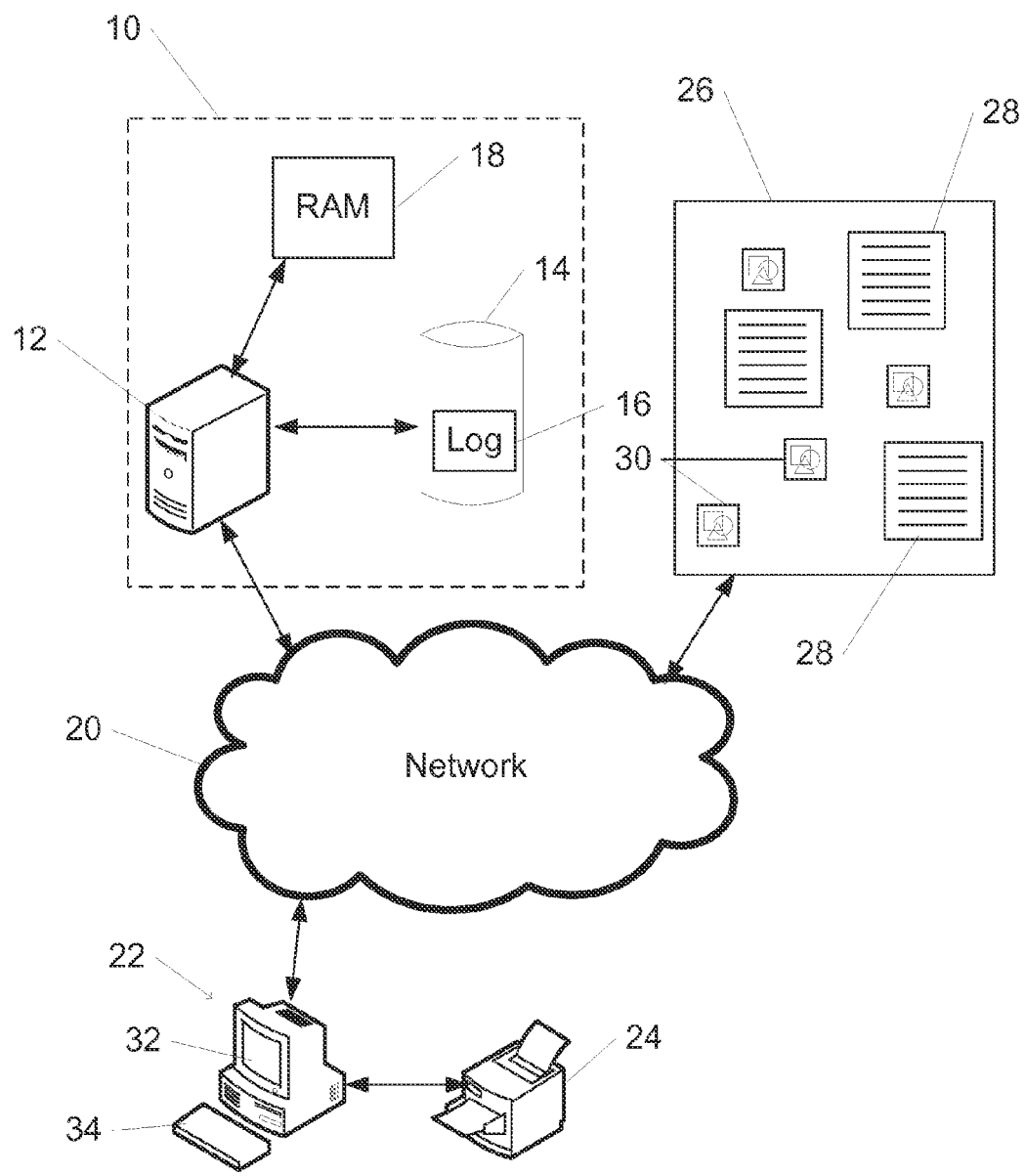
FIG. 1 is a schematic drawing of an example of a system for automatic selection of web page objects for printing.

In accordance with an embodiment of the invention, material on a web page (or similar document that is accessible via a network such as the World Wide Web) may be automatically selected for printing based on analysis of material that was selected by previous users.

For example, a server or other computer that is associated with a plurality of web pages may maintain a print log (e.g. in the form of a database or record) of recorded print requests from those web pages. A recorded print request may include a record of objects on the web page that were selected for printing. When a request to print a current web page is received, the print log may be searched to identify records of similar web pages that had been previously printed (or regarding which user print requests had been submitted) by one or more users. For example, similarity may be determined by structure of the web pages. Thus, web pages in the print log may be considered to be similar when they are generated using similar web page templates.

One or more of the identified records may include a specification of objects the similar web pages that had been selected for printing. For example, a user who had previously submitted a print request may have used an object selection application to select individual objects from the web page for printing. Other objects on the web page may have been excluded from selection.

The identified records may then be analyzed to synthesize the print log data into a representative set of user-selected (or otherwise selected) objects. For example, an analysis may yield a set of objects in the identified records that were most frequently selected for printing. A recommended selection of objects of the current web page may be based on the representative set. The recommended selection of objects of the current web page that corresponds to the representative set of objects may then be automatically selected as an initial or recommended selection for printing.

The automatically selected objects may be distinguished from excluded objects on a display of the current web page. For example, automatically selected objects (and manually selected objects as described below) may be surrounded by a distinguishing border, or may be displayed on a background that is different from a background of excluded objects (e.g. white versus gray, or other color or shading combinations).

In an example of automatic selection of web page objects, a user may be given the opportunity to modify the automatic selection. For example, using an object selection module or application, the user may choose to include additional objects or exclude one or more automatically selected objects.

For example, a web page may include objects that contain informative content which a user may wish to obtain or retain in printed form (e.g. informative text and images), plus additional content that is not informative (e.g. screen controls), or that is informative only within the context of an interactive display (e.g. links or expandable icons). In this case, in order to retain the informative content in compact form, or in order to limit use of paper or printer ink, the user may wish to limit the printing to the informative content only. Thus, automatic selection of web page objects for printing may on the one hand, avoid printing of non-informative content, and on the other hand, reduce the amount of time and effort expended by the user in manually selecting objects for printing.

FIG. 1 is a schematic drawing of an example of a system for automatic selection of web page objects for printing. Web page object selection system 10 may include a processor 12. Processor 12 may include one or more data processing devices that are associated with, or incorporated into, a network server, or with another computer that is capable of communicating with network 20. Processor 12 may operate in accordance with programmed instructions.

Processor 12 may communicate with data storage device 14. For example, data storage device 14 may represent one or more fixed or removable data storage devices that are capable of storing data. Data storage device 14 may be configured to store print log 16. Data storage device 14 may be used to store programming instructions for, and parameters or other data for use in operation of processor 12 or another processor that may communicate with processor 12 via network 20, e.g. client 22.

Processor 12 may communicate with memory device 14. For example, memory device 14 may include one or more memory devices that may be used for storing data as part of operation of processor 12, e.g. a random access memory (RAM) device. For example, memory device 14 may be used to store programming instructions for operation of, or data that is generated during operation of, processor 12.

A client 22 may communicate with web page object selection system 10 via network 20. For example, client 22 may include a computer or a processor with associated memory and data storage devices. Client 22 may include, or be associated with, one or more data output devices 32, e.g. a display screen or audio output device, that enable communication of information to a user that is operating client 22. Client 22 may include input devices 34, e.g. a keyboard or other touch-sensitive device, a pointing device, or an audio or video input device. A user may operate an input device 34 in order to enter instructions or information to a processor or memory device of client 22. For example, a user operating an input device 34 may navigate (e.g. connect) via network 20 to a network accessible site or web page, such as web page 26. Navigation to web page 26 may cause a representation of web page 26 to be displayed, e.g. on a data output device 32. A user operating an input device 34 may initiate a request to print all or part of web page 26, and may indicate objects of web page 26 that are to be included or excluded for printing.

Client 22 may communicate with a printing device, such as printer 24. For example, client 22 may send a representation of an image, such as of all or part of web page 26, to printer 24 for printing.

Web page 26 may include one or more informative content objects 28, and one or more non-informative content objects 30. In the absence of large contiguous blocks of similar or uniform material (e.g. when an informative content object 28 includes an article), or certain types of objects (e.g. screen button or scroll bar), there may not be reliable properties of informative content objects 28 or of non-informative content objects 30 that enable distinguishing between one and the other on the basis of the properties alone.

Selected objects may be saved in the print log in a manner that is based on a formal description of the web page. For example, a web page may be described or defined in terms of Hypertext Markup Language (HTML) elements, or by a corresponding Document Object Model (DOM) tree.

Figure 2A:
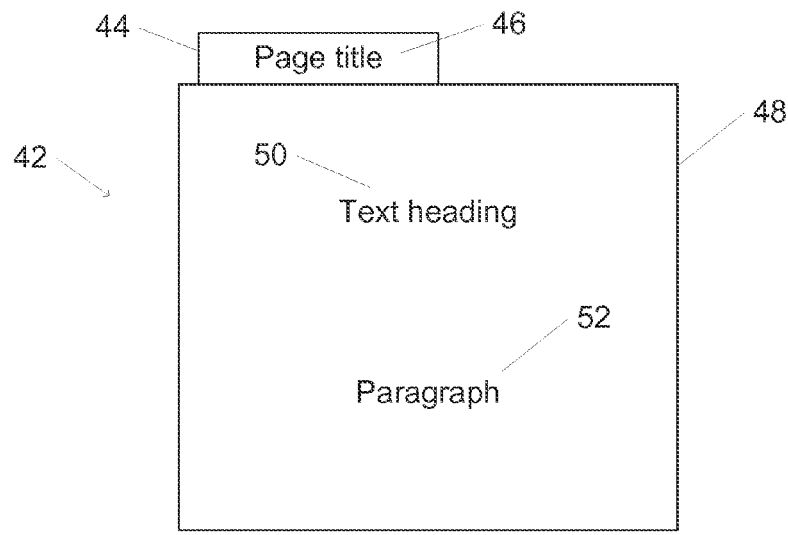
FIG. 2A shows an example of a web page that may be used with an example of a method for automatic selection of web page objects for printing.
Figure 2B:
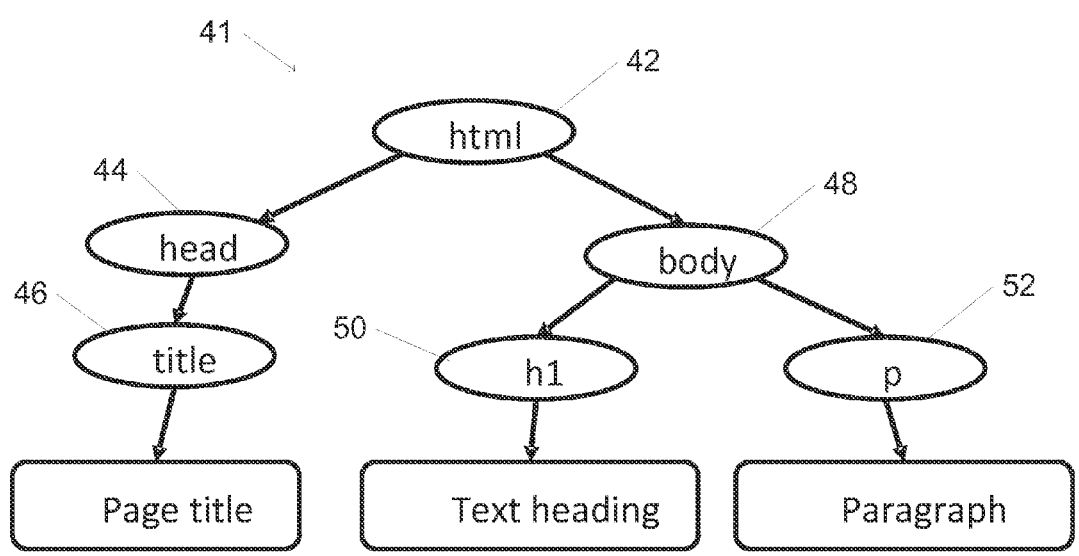
FIG. 2B shows a Document Object Model (DOM) tree corresponding to the web page shown in FIG. 2A.

FIG. 2A shows an example of a web page that may be used with an example of a method for automatic selection of web page objects for printing. FIG. 2B shows a DOM tree corresponding to the web page shown in FIG. 2A. DOM tree 41 may correspond to web page 40 and HTML elements as follows (with corresponding objects of web page 40 and DOM tree 41 indicated in parentheses):

| | |
|---|---|
| <html> | (page 42) |
|   <head> | (page heading 44) |
|     <title>Page title </title> | (page title 46) |
|   </head> | |
|   <body> | (page body 48) |
|     <h1> Text heading </h1> | (text heading 50) |
|     <p> Paragraph </p> | (paragraph 52) |
|   </body> | |
| </html> | |

If a user selects an object of a web page for printing, the selection may be considered as selection of a node within the corresponding DOM tree. For example, the user may select an object by using web page object selection program, module, or application. In the case of the example of FIGS. 2A and 2B, a user may select, for example, page body 48, which includes text heading 50 and paragraph 52. The selected object may be saved in a database in the form of a print log (e.g. print log 16 of FIG. 1). For example, the selected object may be saved as a record in the print log in the form of an XPath expression (in the example shown, e.g. as html/body). If w objects from a web page were selected by a user (or automatically or otherwise selected) for printing, a record in the print log, $L_j$, may be represented by an XPath expression:

$$L_j = \text{URLAddress}:XPath_1, XPath_2 \ldots XPath_w$$

where URLAddress represents the Uniform Resource Locator (URL) address of the web page, and each $XPath_i$ represents a representation of an object of the web page that had been selected for printing. A record may be added to the print log whenever a user has finalized a selection of web page objects for printing (e.g. when generating a print command, e.g. by selecting an appropriate screen control).

Records of the print log may be retrieved for the purpose of automatic selection of web page objects for printing.

Figure 3:
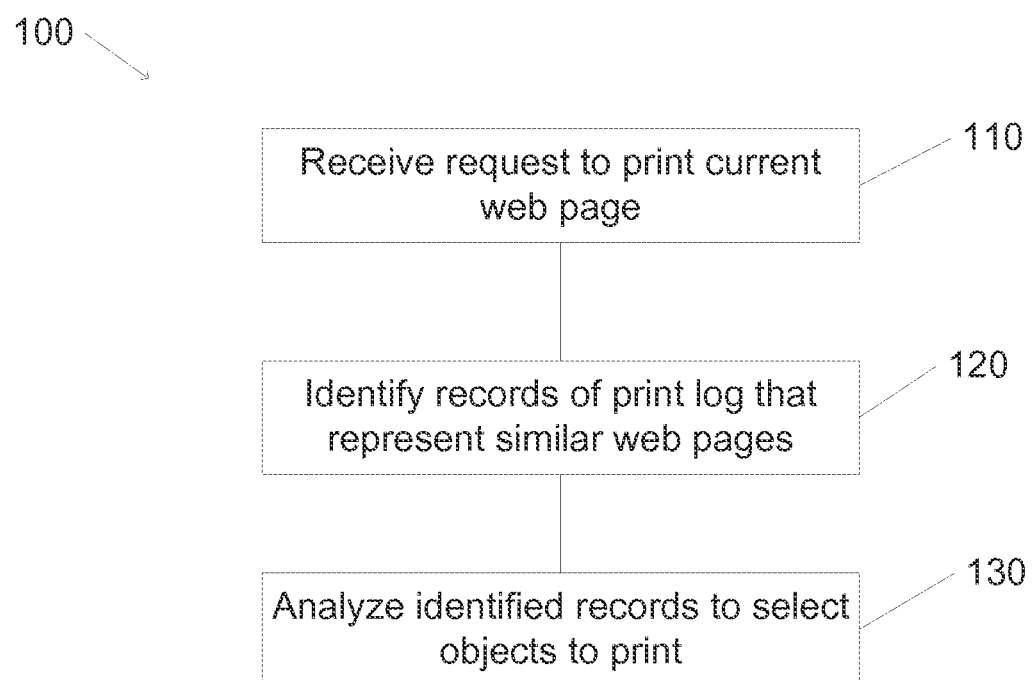
FIG. 3 is a flow chart of an example of a method for automatic selection of web page objects for printing.

FIG. 3 is a flow chart of an example of a method for automatic selection of web page objects for printing. It should be understood with respect to this flowchart and to other flowcharts referred to herein, that the division of a method into discrete operations represented by blocks of the flowchart is for the sake of convenience and clarity only. Alternative divisions of the method into individual operations with equivalent results are possible, and should be understood as representing other examples of the method. Unless indicated otherwise, the order of the blocks in the flowchart has been selected for the sake of convenience and clarity only. Execution of operations that are represented by blocks of the flowchart in a different order or concurrently may yield equivalent results. Such reordering should be understood as representing other examples of the illustrated method.

Automatic web page object selection method 100 may be executed by a processor, e.g. by processor 12 of web page object selection system 10 (FIG. 1) or by another processor that communicates with web page object selection system 10.

Automatic web page object selection method 100 may be executed when a request to print a web page, e.g. a current web page P, is received or detected (block 110). For example, the request may have been issued by a user operating a computer or processor, or by an application being executed by a processor, such as client 22 (FIG. 1) or another computer or processor that communicates with web page object selection system 10. The request may have been sent to a server computer, or to another processor that communicates with web page object selection system 10.

Communication of the request may include sending a representation of current web page P that may be received. For example, a DOM tree, HTML, XPage, URL address, or other representation of web page P may be received.

Records of the print log that represent web pages that are similar to current web page P may be identified (block 120). For example, a print log $\vec{L}$ may be represented as a set or collection of n print log records $L_i$, e.g.

$$\vec{L} = \{L_1, \ldots, L_n\}.$$

The union of all the representations of selected objects in the print log $\vec{L}$ may be written as:

$$X(\vec{L}) = X(L_1) \cup \ldots \cup X(L_n) = \{XPath_1, \ldots, XPath_n\}$$

When a request to print a current web page P is detected by a web page object automatic selection system, device, or application, objects of current web page P may be compared to selected objects in records $L_j$ of print log $\vec{L}$. Records $L_j$ that represent web pages that are similar to current web page P may be identified.

For example, current web page P may be represented in the form of an m-dimensional vector $\{V_1, \ldots, V_m\}$ based on comparison with union $X(\vec{L})$. For example, a vector component $V_i$ may be set to 1 if a DOM tree representation of P includes an object corresponding to $XPath_i$, and to 0 otherwise. Similarly, each print log record $L_i$ of print log $\vec{L}$ may be similarly represented by an m-dimensional vector. Thus, similarity of a print log record $L_i$ to current web page P may be determined by the distance between vector representations of print log record $L_i$ and current web page P in the m-dimensional vector space. For example, a predetermined number of print log records $L_i$ that are nearest to current web page P in the m-dimensional vector space may be identified. As another example, all print log records $L_i$ that are within a predetermined m-dimensional distance form current web page P may be identified. Two such criteria may be combined. For example, up to a predetermined number of print log records may be identified on condition that their m-dimensional distances meet a distance criterion. Print log records satisfying another nearness criterion may be identified.

Based on the selected object data of the identified print log records, one or more objects of the current web page may be selected for printing (block 130). The selection may be modified by a user prior to actual printing by a printer. For example, the identified print log records may be analyzed so as to determine which objects of current web page P a user (or automatic application) is likely to consider as worthy of printing.

For example, given a set of k identified print log records $\{L_1, \ldots, L_k\}$, with $X(L_i)$ representing the XPath expressions that are included in each print log record $L_i$, a subset of s (a variable number of) print log records $\{L_{i1}, \ldots, L_{is}\}$ (ij representing an index of the identified set of print log records from among those included in the subset) from among the set of identified print log records $\{L_1, \ldots, L_k\}$ may be identified that maximizes the expression:

$$\log s \frac{\bigcap_{j=1}^{s} X(L_{ij})}{\bigcap_{j=1}^{s} X(L_{ij})}$$

In the expression, maximizing the factor log s maximizes the number of selected print log records (thus increasing the statistical validity of the sample), while maximizing the factor $$\frac{\bigcap_{j=1}^{s} X(L_{ij})}{\bigcap_{j=1}^{s} X(L_{ij})}$$

maximizes the degree of similarity among the selected objects that are represented in the selected subset of records (e.g. possibly at the expense of reducing m). An appropriate trade off between the two factors may yield a maximum value of the expression. For example, the number k may be small enough so as to enable evaluating the expression for all possible subsets of the k identified records ($2^k-1$ combinations). Other methods may be used to identify print-worthy objects.

On the basis of the analysis of the identified print log records, objects of the current web page may be automatically selected as a recommendation for printing, e.g. by an application that runs on, or at least partially operates a client or user computer, e.g. the computer from which the print request originated. For example, if print-worthy objects were selected by selecting a subset of s identified print log records $\{L_{i1}, \ldots, L_{is}\}$ as above, selected objects of the current web page may include those objects that correspond to the union of the selected objects in the selected subset of records. For example, the union of objects may be represented by $$\bigcap_{j=1}^{s} X(L_{ij}).$$

A list of the automatically select objects of the current web page may be communicated, e.g. via network 20 (FIG. 1), to the computer or processor that submitted the print request, e.g. client 22. The computer or processor that submitted the print request may print in accordance with the list, or a user or application may select additional objects or exclude objects from the selection. For example, the selected objects may be indicated on a display of the current web page as a set of recommended objects, and a user may operate one or more input devices in order to modify the selection.

In accordance with an example of a method for automatic selection of web page objects for printing, communication between a client or other computer that submits a request to print a web page (hereinafter referred to as the client), and a server or other processor that retrieves and analyzes records with previously selected objects from a print log (hereinafter referred as the server), may take place in several stages. Such division of the communication into several stages may reduce the quantity of data that is communicated between the client and the server, and may reduce the number of records of the print log that are examined. In this manner, execution of the method may be expedited, reducing or eliminating delays in selecting objects (or recommending objects) for printing.

Thus, this example of a method for automatic selection of web page objects for printing may include a method to be executed by a server, and another method that is to be executed concurrently, and in a coordinated fashion, by a client.

Figure 4A:
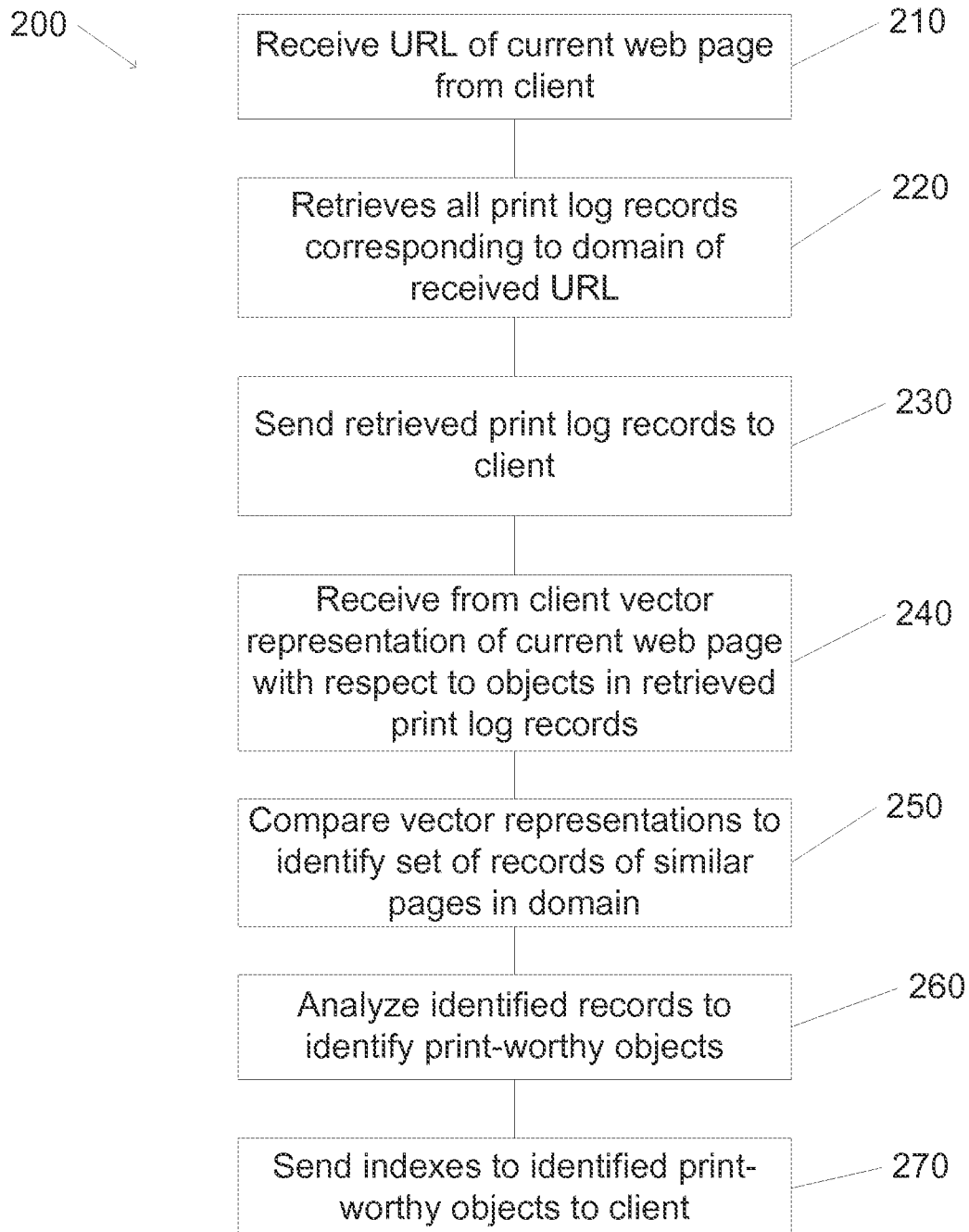
FIG. 4A is a flow chart of an example of a server method for automatic selection of web page objects for printing.
Figure 4B:
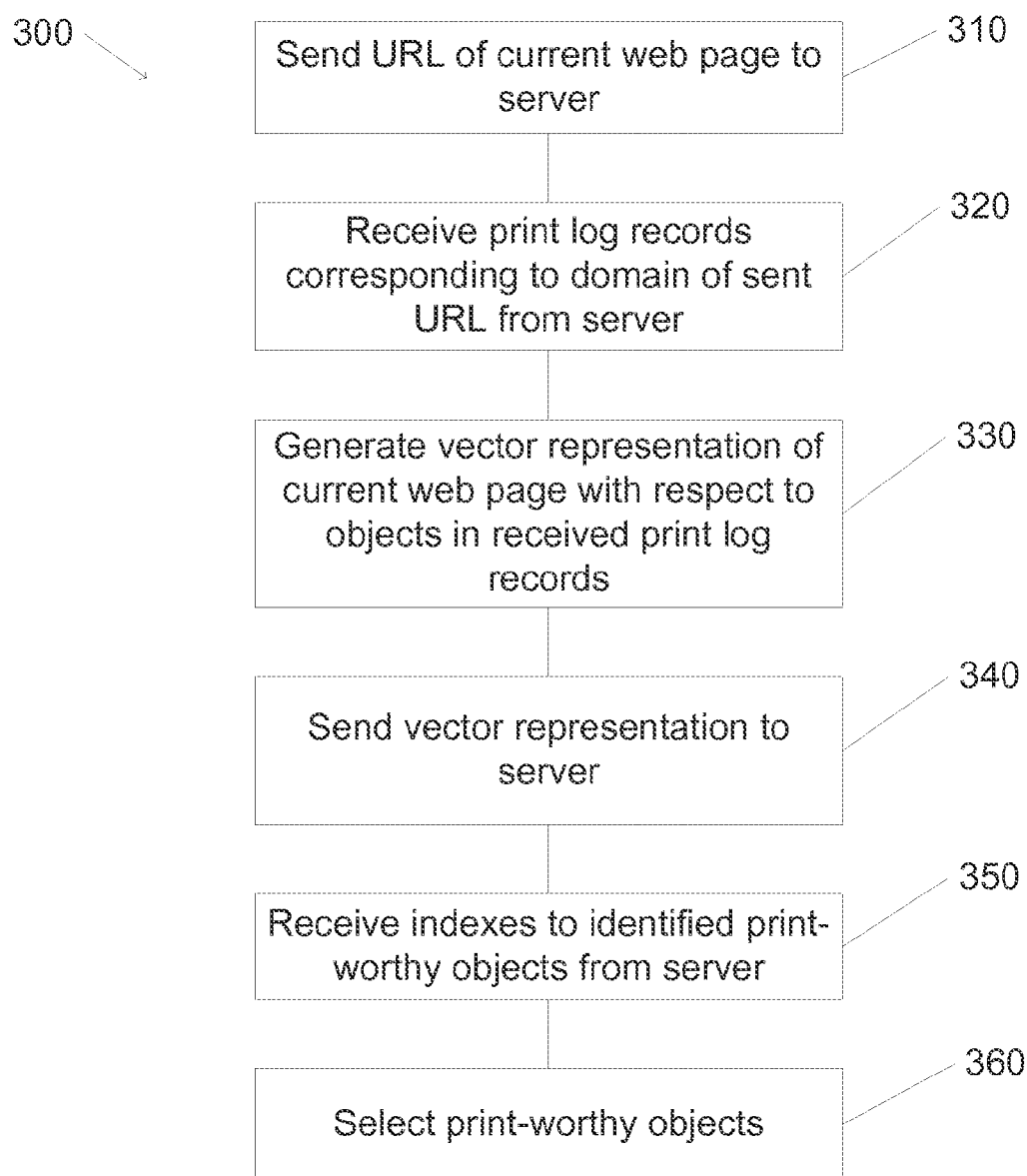
FIG. 4B is a flow chart of an example of a client method for concurrent and coordinated execution with the server method shown in FIG. 4A.

FIG. 4A is a flow chart of an example of a server method for automatic selection of web page objects for printing. FIG. 4B is a flow chart of an example of a client method for concurrent and coordinated execution with the server method shown in FIG. 4A.

Client method 300 may be executed by a client when submitting a request to print a web page, such as current web page P, to a server. Server method 200 may be executed by a server when receiving a request to print a web page from a client.

In submitting the request, the client may send the URL address of current web page P to the server (block 310). By sending the URL address of current web page P rather than a representation (e.g. DOM tree or other representation), the amount of data sent at this point by the client to the server, and thus the time required for the communication, may be substantially minimized. The server may receive the URL address (block 210).

The server may query the print log to retrieve all records that correspond to web pages with the same domain as the received URL (block 220). For example, if the received URL is from aaa.com, all records that correspond to web pages from aaa.com may be retrieved. For example, If the set of retrieved print logs is designated $\vec{L}_{url}$, then the union of selected objects (e.g. in the form of XPath expressions) in set $\vec{L}_{url}$ may be designated $X(\vec{L}_{url})$.

The server may send the retrieved print log records to the client (block 230). For example, the union of objects $X(\vec{L}_{url})$ may be sent to the client. Limiting the sent retrieved objects to objects of pages within the domain of the received URL may significantly reduce the quantity of data that is communicated between the server and the client, and thus the time required for the communication. For example, the size of the union of objects $X(\vec{L}_{url})$ may be significantly smaller than the size of a DOM tree representation (or similar representation) of current web page P. In the event that the sized of the union of objects $X(\vec{L}_{url})$ is excessively large (e.g. containing more objects than a predetermined threshold number of objects, or more than a threshold number that is determined on the basis of some measurable condition, e.g. a data transfer rate) the number of sent objects may be reduced. For example, a frequency analysis may be performed such that objects that occur less frequently among the records of set $\vec{L}_{url}$ are not sent. The client may receive the retrieved print log records (block 320), e.g. the union of objects $X(\vec{L}_{url})$.

The client may compare the current web page to the selected objects of the retrieved print log records (block 330). For example, the client may generate a vector representation of the current web page in terms of the union of objects $X(\vec{L}_{url})$, as described above. The client may send the generated vector representation to the server (block 340). The server may receive the generated vector representation (block 240).

The server, on the basis of the received vector representation (or similar representation of a comparison of the current web page with the union of objects $X(\vec{L}_{url})$, may identify from the print log those records that correspond to similar web pages within the domain of the received URL (block 250). For example, the server may identify a predetermined number of records of the print log that correspond to web pages whose vector representations are closest to the vector representation of the current web page in a corresponding vector space. As another example, the server may identify all records of the print log that correspond to web pages whose vector representations are within a predefined distance in the vector space from the vector representation of the current web page.

Data from the identified most similar web page records may be analyzed by the server to identify a subset of the objects that are considered print-worthy (block 260). For example, selected objects in the various identified records may be synthesized to yield an identified set of print-worthy objects, e.g. as described above.

An indication of the identified print-worthy objects may be sent by the server to the client (block 270). For example, the client may have been sent previously the union of objects $X(\vec{L}_{url})$ (as in the operation that corresponds to block 230). Therefore at this point, only indexes (or other indicators) to the selected objects within the previously sent union of objects) $X(\vec{L}_{url})$ need be sent. By sending indexes to previously sent objects rather than a specification of the selected objects, the amount of data sent from the server to the client (as well as the time required for sending the data) may be reduced.

The client may receive the indicated objects, e.g. indexes that were sent (block 350). The client may select the indicated print-worthy objects (block 360). For example, the client may automatically select the identified print-worthy objects for printing, may indicate those objects the identified print-worthy objects (e.g. on a displayed representation of the current web page), may enable a user to include additional objects or exclude objects from a tentative or recommended selection of print-worthy objects, perform other actions, or a perform a combination of the above actions.

A server, or other computer or processor with access to the print log, may be configured to maintain an updated print log. For example, if a web page at a particular URL has changed, a corresponding record of the print log may no longer be completely valid (e.g. selected objects in the record may no longer correspond to existing objects of the web page). If the difference between the web page as it currently exists and the record is significant (e.g. more than a threshold number of differences) that record may be deleted from the print log.

For example, the server may periodically (e.g. in accordance with a predetermined schedule or in response to a predetermined set of conditions) check ("crawl") a web site at URL address that is included in a record of the print log. If no web page exists at the URL address, the record that includes that URL address may be removed from the print log. If the web page exists, the record of the print log may include selected objects that no longer correspond to objects of the web page in its current state. If the number of the selected objects, or a fraction of the selected, that no longer correspond to objects of the web page exceeds a threshold, the record may be removed from the print log.

In accordance with an example of automatic selection of web page objects for printing, a computer program application stored in non-volatile memory or computer-readable medium (e.g., register memory, processor cache, RAM. ROM, hard drive, flash memory, CD ROM, magnetic media, etc.) may include code or executable instructions that when executed may instruct or cause a controller or processor to perform methods discussed herein, such as an example of a method for automatic selection of web page objects for printing.

The computer-readable medium may be a non-transitory computer-readable media including all forms and types of memory and all computer-readable media except for a transitory, propagating signal. In one implementation, external memory may be the non-volatile memory or computer-readable medium.

We claim:

1. A method comprising:
    receiving a request to print a current web page;
    identifying a set of records that represent a plurality of previous web pages that are similar to the current web page from a print log that includes at least one record, each record including an indication of a previous web page and indicating one or more objects that had been previously selected for printing from that previous web page, wherein the current web page is not included in the plurality of previous web pages; and
    based on said one or more objects that are indicated by the identified set of records, selecting one or more objects of the current web page to be printed on a printer.

2. The method of claim 1, wherein identifying the set of records comprises:
    receiving a Uniform Resource Locator (URL) of the current web page; and
    retrieving print log records that correspond to previous web pages with the same URL domain as the received URL.

3. The method of claim 1, wherein identifying the set of records comprises calculating a distance in a vector space between a vector representation of the current web page and a corresponding vector representation of a record of the print log.

4. The method of claim 3, wherein a component of the vector representation corresponds to an object of a union of objects from records of the print log and a value of the component indicates whether that object is present in the current web page or the record that the vector represents.

5. The method of claim 1, wherein identifying the set of records comprises identifying no more than a predetermined number of records of the print log that represent previous web pages that are most similar to the current web page.

6. The method of claim 1, wherein the selected objects to be printed comprise a union of objects in a subset of the identified set of records.

7. The method of claim 1, wherein selecting objects of the current web page comprises finding a subset of s records of the identified set of records so as to maximize an expression, where X(Lij) represents the set of objects in record Lij of the subset, and where ij is an index of a record of the identified set that is included in the subset.

8. The method of claim 1, wherein the print log includes records for web pages that were previously selected by a plurality of users.

9. A non-transitory computer readable medium having stored thereon instructions that when executed by a processor will cause the processor to perform the method of:
    receiving a request to print a current web page;
    identifying a set of records that represent a plurality of previous web pages that are similar to the current web page from a print log that includes at least one record, each record including an indication of a previous web page and indicating one or more objects that had been previously selected for printing from that previous web page, wherein the current web page is not included in the plurality of previous web pages; and
    based on said one or more objects that are indicated by the identified set of records, selecting one or more objects of the current web page to be printed on a printer.

10. The non-transitory computer readable medium of claim 9, wherein identifying the set of records comprises:
    receiving a Uniform Resource Locator (URL) of the current web page; and
    retrieving print log records that correspond to previous web pages with the same URL domain as the received URL.

11. The non-transitory computer readable medium of claim 9, wherein identifying the set of records comprises calculating a distance in a vector space between a vector representation of the current web page and a corresponding vector representation of a record of the print log.

12. The non-transitory computer readable medium of claim 11, wherein a component of the vector representation corresponds to an object of a union of objects from records of the print log and a value of the component indicates whether that object is present in the current web page or the record that the vector represents.

13. The non-transitory computer readable medium of claim 9, wherein identifying the set of records comprises identifying no more than a predetermined number of records of the print log that represent previous web pages that are most similar to the current web page.

14. The non-transitory computer readable medium of claim 9, wherein the print-worthy objects comprise a union of objects in a subset of the identified set of records.

15. The non-transitory computer readable medium of claim 9, wherein selecting objects of the current web page comprises finding a subset of s records of the identified set so as to maximize an expression, where X(Lij) represents the set of objects in record Lij of the subset, and where ij is an index of a record of the identified set that is included in the subset.

16. The non-transitory computer readable medium of claim 9, wherein the print log includes records for web pages that were previously selected by a plurality of users.

17. A system comprising:
    a data storage device to store a print log, each record of the print log including an indication of a previous web page and indicating objects that had been previously selected for printing from the indicated previous web page; and
    a processor unit to access that print log and in communication with a computer readable medium, wherein the computer readable medium contains a set of instructions, wherein the processor is to execute the set of instructions to:
        upon a request to print a current web page, identify from the print log a set of records that represent a plurality of previous web pages that are similar to the current web page, wherein the current web page is not included in the plurality of previous web pages; and
        analyze the identified set to identify print-worthy objects of the current web page.

18. The system of claim 17, wherein the processor is to identify the set of records based on a measure of similarity between the current web page and the plurality of previous web pages.

19. The system of claim 18, wherein the measure of similarity is based on a distance in a vector space between a vector representation of the current web page and a corresponding vector representation of a record of the print log.

20. The system of claim 17, wherein the print log includes records for web pages that were previously selected by a plurality of users.

* * * * *